Patented Mar. 28, 1939

2,152,372

UNITED STATES PATENT OFFICE 2,152,372

NITRATED PENTAERYTHRITOL MOTHER-LIQUOR

Joseph A. Wyler, Allentown, Pa., assignor to Trojan Powder Company, Allentown, Pa.

No Drawing. Application November 4, 1938, Serial No. 238,804

11 Claims. (Cl. 52—5)

This invention relates to a composition of matter and to a process for the preparation thereof. More specifically, it relates to the nitrated product obtained by the nitration of the liquid end-product formed during the commercial preparation of pentaerythritol by the alkaline condensation of formaldehyde and acetaldehyde.

An object of this invention is to convert a hitherto worthless by-product into a material of value in the explosives industry.

A further object is to provide a new liquid explosive of certain unusual properties which are disclosed in a later part of this specification.

A still further object is to provide explosive compositions in which this new nitrated product is associated with other nitrated explosives, oxidizing agents, oxidizable agents, heat producing agents, density modifying agents and other agents for causing changes in the character and condition of explosive mixtures.

Other objects of this invention will become apparent upon further perusal of this specification.

The commercial preparation of pentaerythritol is based upon the reaction of one molecule of acetaldehyde upon 4 molecules of formaldehyde, such reaction taking place in the presence of 4 to 5 molecules of formaldehyde for each molecule of acetaldehyde, in alkaline medium, and in such a volume of water as to provide a solution containing less than 20% of aldehydes at the beginning of the reaction.

The main reaction may be represented as follows:

where M equals a univalent metal or one-half of a bivalent metal.

In these commercial processes the alkali used for the condensation is $Ca(OH)_2$, $Ba(OH)_2$, or NaOH. Consequently, after the condensation itself the pentaerythritol must be separated from a metal formate and other products. Usually, this is done by treating the mixture after the condensation reaction, with sulphuric acid or oxalic acid or both, to precipitate the Ca or Ba ions as sulfate or oxalate. The insoluble Ca or Ba salts are separated by filtration, leaving the pentaerythritol, formic acid, and various by-products in solution.

The solution thus formed is subjected to repeated evaporations and crystallizations in order to separate the pentaerythritol and the dipentaerythritol (formed by a side reaction) from a syrupy product. This syrupy product usually contains less than a substantial amount of pentaerythritol or dipentaerythritol and is therefore discarded by the commercial manufacturers of pentaerythritol, as a worthless by-product.

I have discovered that, contrary to the general impression given in the literature, this syrup may be nitrated to form a nitrated product useful in the explosives industry.

This syrup, as it exists immediately after the separation of the pentaerythritol and the dipentaerythritol is usually of a brownish color and consists of water, formic acid, acetic acid, methyl alcohol, ethyl alcohol, formates, aldehydic or ketonic substances, compounds possessing the primary alcohol group or groups (—CH₂OH), and/or secondary alcohol groups (=CHOH), probably some formose, other polyhydroxy substances, as well as other unknown substances.

This syrup is freed of most of its moisture and volatile constituents by any suitable method, such as vacuum distillation, vacuum drum drying, etc. after which it is in the form of a very viscous liquid ready for nitration.

The nitration of this liquid may be carried out by means of concentrated nitric acid alone, a mixture of concentrated nitric acid and sulphuric acid, a mixture of concentrated nitric acid and phosphoric acid or, in general, a mixture of nitric acid and a dehydrating agent.

In order to more clearly point out how I nitrate this product, the following examples are given.

*Example #1*

1 part, by weight, of this dried syrup is added slowly, with stirring, to 10 parts, by weight, of 95% HNO₃ contained in a suitable vessel. The temperature is kept below 30° C. When all of the syrup has been added, the mixture will have a milky appearance and practically all of the nitrated product will be in solution in the excess of nitric acid. Stir for an additional half hour. Then allow the contents of the nitrator to flow into about three times its volume of cold water, as the mixture is being stirred. This precipitates the nitrated product in the form of a syrup or gum, which is allowed to separate out and is then given several water washes, one or more washes with a dilute aqueous solution of sodium carbonate, sodium bicarbonate, disodium phosphate or any other suitable base, and is then allowed to settle so as to become fairly dry.

This viscous layer, which is the impure nitrated product, may then be dissolved in a solvent, such as acetone and the solution treated with a slight excess of ammonium carbonate or other suitable alkali in order to neutralize all free acid which may be present in the solution. The alkaline mixture is stirred for a half hour or more in order to insure complete neutralization of any free acid which may be present and thus to further stabilize the nitrated product.

This alkaline solution is then treated with water in order to cause the precipitation of the nitrated product and to cause the substantial removal of the acetone from this nitrated material. After several water washes, combined with settling at room or slightly elevated temperatures, this viscous, nitrated product is ready for use in the explosives industry.

*Example #2*

1 part, by weight, of the dried syrup is slowly added to about 8 parts by weight of 95% HNO$_3$ contained in a nitrating vessel. The mixture is thoroughly stirred and cooled to below 30° C. When all of the syrup has been added, about 5 parts by weight of concentrated sulphuric acid are slowly added, keeping the temperature low.

The mixture is stirred for one-half to one hour or more, is then drowned in a large volume of cold water and then handled in essentially the same manner as under Example #1. The nitrated product after drying contained 12.87% N and was practically colorless.

It will, of course, be apparent to a person skilled in this art that many modifications and alterations may be made in the methods given in the examples without departing from the spirit of this invention.

The nitration product made in accordance with my disclosure is a new and useful composition of matter. Its nitrogen content, determined by means of the nitrometer, is at least 12.50% N. It is an explosive and remains liquid or viscous to temperatures below the freezing point of water. It possesses satisfactory stability toward heat. It is soluble in acetone, ether, ethylene dichloride, benzene, toluol, chloroform and tetrachlorethane. It is rather difficultly soluble in methyl alcohol, ethyl alcohol and propyl alcohol; and insoluble in propane, pentane, and carbon tetrachloride.

It possesses the unexpected properties of being soluble in benzene and of being a non-solvent for nitrostarch in the cold, and also of either having by itself alone or in combination with a small proportion of benzene, appreciable solvent effect upon rubber. Furthermore, it is non-headache producing and possesses a very low volatility.

My nitrated product is an explosive and may be used alone or it may be used in association with other nitrated products as nitrostarch, nitrocellulose, nitroglycerin, nitrated sugar, pentaerythritol tetranitrate, nitrated glycols, nitrotoluenes, and the like; with oxidizing materials as ammonium nitrate, sodium nitrate, potassium nitrate, potassium perchlorate, and ammonium perchlorate; with oxidizable agents as charcoal, coal, wood pulp, vegetable ivory, bagasse, oils and other carbonaceous materials; with heat producing agents as powdered aluminum, ferrosilicon, and metallic silicon; and with modifying agents as sodium chloride, sodium bicarbonate, ammonium oxalate, zinc oxide, rubber and the like.

It will be apparent to those versed in the explosives art that my invention comprehends not only free-flowing, but also plastic and waterproof explosives, and that my new explosive has usefulness as a waterproofing, anti-caking, and anti-setting agent for such salts as ammonium nitrate and sodium nitrate.

Having described my new product and also having given two examples of the preparation of this product I wish to emphasize that I do not limit myself to these two specific embodiments of my process. Many changes may be made in the operative details by a skilled worker without departing from the essence of this invention and therefore I do not choose to limit my invention except as indicated in the appended claims.

I claim:

1. The process of nitrating the syrup remaining after the separation of the pentaerythritols from the reaction mixture produced in the commercial pentaerythritol alkaline condensation of formaldehyde and acetaldehyde, comprising the treatment of this syrup with a nitrating acid at a temperature below 30° C.

2. The process of nitrating the syrup remaining after the separation of pentaerythritols from the reaction mixture produced in the commercial pentaerythritol alkaline condensation of formaldehyde and acetaldehyde, comprising the treatment of this syrup with concentrated nitric acid at a temperature below 30° C.

3. The process of nitrating the syrup remaining after the separation of pentaerythritols from the reaction mixture produced in the commercial pentaerythritol alkaline condensation of formaldehyde and acetaldehyde, comprising the addition of about 1 part by weight of this syrup to about 8 parts by weight of 95% HNO$_3$, followed by the addition of about 5 parts by weight of oil of vitriol, below 30° C., and then drowning the nitrated charge in an excess of water.

4. The process of nitrating the syrup remaining after the separation of pentaerythritols from the reaction mixture produced in the commercial pentaerythritol alkaline condensation of formaldehyde and acetaldehyde, comprising the addition of about 1 part by weight of this syrup to about 8 parts by weight of 95% HNO$_3$, followed by the addition of about 5 parts by weight of oil of vitriol, below 30° C., and then drowning the nitrated charge in an excess of water, washing, neutralizing with an alkaline solution, separating from water, dissolving the gum in acetone, neutralizing again, and then treating this acetone solution with water in order to precipitate the nitrated syrup substantially free from acetone.

5. The nitrated product resulting from the nitration of the substantially pentaerythritol-free syrup produced in the commercial alkaline condensation of formaldehyde and acetaldehyde.

6. The syrupy nitrated product resulting from the nitration of the substantially pentaerythritol-free syrup produced in the commercial alkaline condensation of formaldehyde and acetaldehyde.

7. The syrupy nitrated product resulting from the nitration of the substantially pentaerythritol-free syrup produced in the commercial alkaline condensation of formaldehyde and acetaldehyde and containing at least 12.50% N when dry.

8. An explosive comprising the syrupy nitrated product resulting from the nitration of the substantially pentaerythritol-free syrup produced is the commercial alkaline condensation of formaldehyde and acetaldehyde.

9. An explosive comprising the syrupy nitrated product resulting from the nitration of the substantially pentaerythritol-free syrup produced in the commercial alkaline condensation of formaldehyde and acetaldehyde, and nitrostarch.

10. An explosive comprising the syrupy nitrated product resulting from the nitration of the substantially pentaerythritol-free syrup produced in the commercial alkaline condensation of formaldehyde and acetaldehyde, nitrostarch and an oxidizing salt.

11. An explosive comprising the syrupy nitrated product resulting from the nitration of the substantially pentaerythritol-free syrup produced in the commercial alkaline condensation of formaldehyde and acetaldehyde, and rubber.

JOSEPH A. WYLER.